(12) United States Patent
Malomo et al.

(10) Patent No.: US 9,662,737 B2
(45) Date of Patent: May 30, 2017

(54) EQUIPMENT FOR COLD-CLEANING OF WELDING TORCHES, AND THE CORRESPONDING COOLING-FLOW DISPENSING DEVICE

(75) Inventors: Alfredo Malomo, Bergamo (IT); Gianluca Porto, Bergamo (IT)

(73) Assignees: PRAXAIR TECHNOLOGY INC., Danbury, CT (US); SOCIETA' ITALIANA ACETILENE E DERIVATI S.I.A.D. S.P.A. IN ABBREVIATED FORM S.I.A.D.S.P.A., Bergamo (IT)

( * ) Notice: Subject to any disclaimer, the term of this patent is extended or adjusted under 35 U.S.C. 154(b) by 332 days.

(21) Appl. No.: 13/985,211

(22) PCT Filed: Feb. 22, 2012

(86) PCT No.: PCT/IB2012/050803
§ 371 (c)(1),
(2), (4) Date: Sep. 25, 2013

(87) PCT Pub. No.: WO2012/114282
PCT Pub. Date: Aug. 30, 2012

(65) Prior Publication Data
US 2014/0060593 A1    Mar. 6, 2014

(30) Foreign Application Priority Data
Feb. 23, 2011    (IT) ................ MI2011A0269

(51) Int. Cl.
*B23K 9/32* (2006.01)
*B24C 1/00* (2006.01)

(52) U.S. Cl.
CPC .............. *B23K 9/328* (2013.01); *B24C 1/003* (2013.01)

(58) Field of Classification Search
CPC combination set(s) only.
See application file for complete search history.

(56) References Cited

U.S. PATENT DOCUMENTS

| 5,853,128 A | 12/1998 | Bowen et al. |
| 2009/0057443 A1* | 3/2009 | Sendo ..................... 239/405 |

FOREIGN PATENT DOCUMENTS

| DE | 102005030928 | 1/2007 |
| DE | 102008059764 | 10/2009 |
| WO | 94/00712 | 1/1994 |

OTHER PUBLICATIONS

International Search Report PCT/IB2012/050803.

* cited by examiner

*Primary Examiner* — Michael Barr
*Assistant Examiner* — Rita Adhlakha
(74) *Attorney, Agent, or Firm* — Silvia Salvadori, P.C.; Silvia Salvadori

(57) ABSTRACT

An equipment for cleaning welding torches having a reserve of a pressurized fluid and a dispensing device designed to dispense a flow of dry ice at low temperature onto a welding torch in order to clean it of welding slag, wherein the dispensing device comprises a manual needle regulation valve, a dispensing nozzle to dispense dry ice and an adapter sleeve designed to receive the outer shroud or body of welding torch, wherein the dispensing device is designed to be coupled to welding torch to be cleaned by means of a male-female coupling, with adapter sleeve acting as the female part and the tip of supply nozzle as the male part, so that dispensing device can be adapted to the usual dimensions of welding torches.

10 Claims, 3 Drawing Sheets

EQUIPMENT FOR COLD-CLEANING OF WELDING TORCHES, AND THE CORRESPONDING COOLING-FLOW DISPENSING DEVICE

This application is a U.S. national stage of PCT/IB2012/050803 filed on Feb. 22, 2012, which claims priority to and the benefit of Italian Application No. MI2011A000269 filed on Feb. 23, 2011, the contents of which are incorporated herein by reference in their entirety.

FIELD OF INVENTION

The present invention relates in general to the field of equipment and devices for cleaning welding torches, and in particular to equipment that uses a flow consisting of a cold fluid, or having a relatively low temperature compared with ambient temperature, which is conveyed to and directed against a welding torch in order to clean it.

The present invention also relates to a dispensing device, which forms an essential part of said equipment, designed to dispense a cooling flow generated by expansion in the external environment of a pressurised fluid, in particular carbon dioxide, onto a welding torch, in order to clean it.

BACKGROUND TO THE INVENTION AND PRIOR ART

Numerous welding systems and processes, involving corresponding equipment and devices, designed for a wide variety of uses and applications, such as in the manufacture of sheet metal, pipes, structural sections and parts with different materials and geometries in general, are known and extensively used in the prior art.

For the sake of completeness, and in order to introduce the characteristics and advantages of the present invention in the most appropriate way, the main known welding systems and processes will be briefly cited and commented on below.

TIG (Tungsten Inert Arc)

The TIG process exploits the heat produced by an electrical arc that jumps between a non-consumable electrode, in particular an electrode made of tungsten with other alloys, and the part to be welded; the weld pool is protected by a flow of gas or mixtures, with inert characteristics, which is conveyed by special ceramic nozzles.

The process can be used with or without filler metal, which in turn can be supplied from the exterior, either manually or by automated devices.

MIG/MAG (Metal Inert Gas or Metal Active Gas)

The MIG and MAG processes exploit the thermal energy supplied by an electrical arc that jumps between a consumable solid wire electrode, which is continuously fed axially in the welding area, and the part to be welded.

In said processes, the weld pool is protected by a continuous flow of gas mixtures conveyed by nozzles, wherein the type of gas mixture used defines the welding process: the process is called MIG when inert gases and mixtures are used, and MAG when active oxidising gases and mixtures are used.

Plasma

This welding process exploits the properties of a special state of matter, called "plasma", which is generated in a gas by the passage of an electrical arc, strongly ionising the gas atoms so that they become capable of conducting energy.

FCAW (Flux-Cored Arc Welding)

This welding process, which exploits the characteristics of the MIG/MAG processes, involves the use of a tubular wire, made to advance axially, into which a particular chemical powder called "flux" is introduced.

The common denominator of all said processes is the use of a special welding instrument, commonly called a "welding torch" which, although it can vary physically according to the process performed, consists of a series of main components that perform the same or substantially similar functions.

It should be noted that in MIG/MAG and FCAW processes the filler material, in the form of a welding wire, is continuously fed by a feed guide fitted in the welding torch, whereas in TIG and plasma processes the filler material is fed manually, or through a device external to the torch.

For the sake of completeness, FIG. 7 shows a cross-section of a typical welding torch, indicated as TS, which is among those most commonly used, and in particular is designed for use in a MIG/MAG process, wherein the following main parts can be distinguished:

A Handle
B Insulator and threaded insert to guide filler wire
C Outer shroud or body
U Shielding gas nozzle
E Contact shoe between electrical conductor and filler wire guide
O Shielding gas passage
M Filler wire.

Regardless of the specific welding process in which it is used, the welding torch tends to accumulate welding residues and slag on its outer surface during use, which can reduce its efficiency and consequently that of the welding process.

The problem therefore arises of how to keep the torch free of the slag and residues that accumulate during the welding process for as long as possible, and how to remove said slag and residues from the torch, so as to continue using it, when the quantity accumulated on the welding torch reaches such a level as to prejudice its performance.

In the current state of the art and current practice, two main systems are used to keep welding torches clean and clean them of said welding slag and residues: one based on a chemical action and the other on a mechanical action.

In particular, the first system involves the use of anti-adhesive substances, usually contained in spray cans, which are sprayed on the parts of the welding torch before use and are designed to minimise the quantity of spatter, slag and residues that accumulate on the torch over time as a result of the welding operation.

Specifically, the method of use of this first cleaning system involves, before using the welding torch, dismantling the protective outer shroud or body of the torch, cleaning it of residues, and spraying its interior and the shielding gas nozzle with a film of anti-adhesive product.

In this way, the mechanical parts of the welding torch which are exposed to moisture are also protected against corrosion, with a reduction in wear on those parts caused by high temperatures or pressures.

Nevertheless, despite the application of said anti-adhesive substances, slag and residues tend to be deposited on the welding torch over time, though more slowly, with the result that after a certain period of use it is always necessary, at least in most cases, to remove the slag deposited on the body of the torch mechanically, using a cloth or pliers.

However, this first system has the drawback of needing a continuous supply of said spray cans, based on the workload of the torch, and is also onerous in terms of environmental impact, due to the high consumption of spray cans which must be disposed of, and the environmental emissions of the gases they contain.

The second cleaning system removes welding slag and residues from the welding torch by abrasive action, performed by a mechanical cutter.

This cleaning system, which is mainly used in automatic welding processes, has the drawback of considerably reducing the working life of the welding torch due to the abrasive action exerted on it; it also has the considerable limitation of only cleaning the terminal part of the shielding gas nozzle, while the interior of the nozzle, which has a larger diameter, and the filler wire guide, are never cleaned, with the result that welding deposits and slag accumulate there over time.

Consequently, even when this system requires removal of the outer shroud or shell of the torch before use, it cannot reach and clean the less accessible parts.

For the sake of completeness, it should be mentioned that the prior art includes welding torch cleaning systems and equipment which are based, at least in general, on the use of cold, and in particular use a jet or flow, formed by a cold fluid or a fluid at a relatively low temperature compared with ambient temperature, which is forcibly ejected against the torch to clean it.

The fluid used to form the cold jet can consist, for example, of carbon dioxide, supplied from a reserve where it is kept under pressure, which is caused to expand in the external environment at ambient pressure so that it cools and generates a flow containing solidified particles or pellets of carbon dioxide, called "dry ice", which is directed against the welding torch to be cleaned.

When the solidified carbon dioxide particles collide with the surface of the torch, they perform a mechanical action that removes the welding slag and swarf deposited on that surface.

Said particles then sublimate or evaporate, after performing their mechanical action of swarf removal, so as to not leave any trace on the surface of the welding torch after cleaning.

In practice, this cleaning process has proved particularly effective to remove welding slag and swarf, due to the mechanical action performed by the solid particles contained in the flow of dry ice when they collide with the torch surface, and also presents the major advantage of not leaving residues on the welding torch after cleaning.

Examples of these systems, which use a cold jet or flow, formed by a fluid such as carbon dioxide at low temperature, to clean a welding torch, are described, for example, in granted American patent U.S. Pat. No. 6,732,955 B2 and published American patent application US 2008/0236633 A1.

However, said cold-cleaning systems, as described in said patent documents, appear, at least in general, to be fairly complex and inconvenient to use, whereas interested users, who may be tradesmen and/or small firms that only occasionally perform welding jobs, still need welding torch cleaning equipment which is simple, so as to require low maintenance, inexpensive, and above all easy and practical to use.

This rather complex construction, together with the low practicality of use of said known cleaning systems, in particular those using a flow of dry ice which is directed against the welding torch to clean it of slag, may at least partly explain why these cold-based systems have not yet been effectively used in industrial practice, despite their undeniable efficacy in removing welding slag and swarf and other substantial advantages connected with their use, such as the fact that they do not leave residues on the welding torch after cleaning.

In any event, regardless of the reasons for the non-use of said cold-based welding torch cleaning systems, at least at present, it should be emphasised that any improvement on them, in particular in terms of further improving their performance and practicality of use, is sure to be favourably received, because it is designed to meet the continual need for innovations, lower costs and more effective results in the field of maintenance and cleaning of welding torches.

SUMMARY OF THE INVENTION

Consequently, the first purpose of the present invention is to propose and implement welding torch cleaning equipment based on the use of cold, in particular the type using a cooling flow formed by a fluid, such as carbon dioxide, ejected against the welding torch to clean it of slag, which constitutes a considerable innovation on the equipment and devices already known for cleaning welding torches, and in particular offers more practical use and even more effective cleaning results.

A second purpose of the present invention, connected with the first, is to promote, to a large and variegated bracket of users, the use and application on the market of this cold-based welding torch cleaning technology, which unfortunately has not yet received the attention and popularity it undoubtedly deserves.

Said purposes can be deemed to be fully achieved by the cold-based welding torch cleaning equipment and associated cooling flow dispenser having the characteristics described in independent claims 1 and 9.

Particular embodiments of the present invention are also described in the dependent claims.

The novel welding torch cleaning equipment according to the present invention offers numerous advantages over the current systems and practice, which have already been partly implicitly stated, and are as listed below, by way of example but not of limitation:

great practicality during use;

rapid performance of welding torch cleaning, leading to increased productivity;

ability to remove all welding residues, slag and spatter accumulated on the torch;

complete cleaning of the welding torch even in areas difficult to reach with the current systems;

a considerable increase in the working life of the parts of the welding torch;

total absence of abrasions caused by mechanical actions on the body of the torch;

no environmental impact caused by atmospheric pollution or waste disposal;

ability to prevent the formation of oxides on the weld, because the cleaning operation takes place in the absence of moisture;

an improvement in general working conditions, as the operator is not obliged to handle and dismantle the red-hot welding torch to clean it;

improved conditions in the workplace, which is not polluted by chemicals associated with the use of spray cans or affected by noise deriving from the use of mechanical cutters to clean the welding torch.

BRIEF DESCRIPTION OF DRAWINGS

These and other purposes, characteristics and advantages of the present invention will clearly appear from the following description of a preferred embodiment thereof, given by way of example but not of limitation, by reference to the annexed drawings.

DESCRIPTION OF A PREFERRED EMBODIMENT OF THE INVENTION

Figure 1:
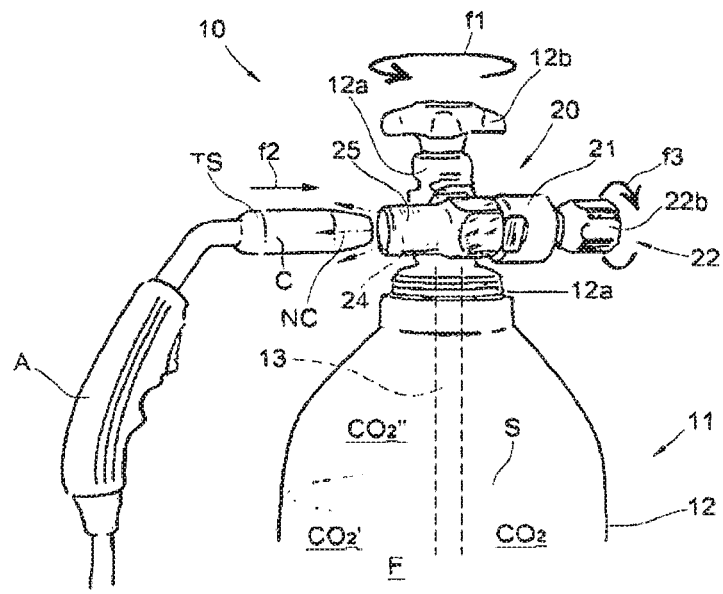
FIG. 1 is a general, schematic view of equipment for cold-cleaning welding torches according to the present invention.

As shown in FIG. 1, equipment 10 for cleaning welding torches, made in accordance with the present invention, in particular comprises:
 a reserve 11 of a pressurised fluid F; and
 a dispensing device 20 connected to reserve 11,
wherein dispensing device 20 is designed to receive pressurised fluid F from the corresponding reserve 11 and to dispense it on a welding torch, indicated as TS, to be cleaned, a jet or flow G, which is cold or has a relatively low temperature compared with the ambient temperature, and which is generated by expansion in the external environment and consequent cooling of pressurised fluid F received from reserve 11.

For example, reserve 11 consists of an ordinary cylinder 12, containing pressurised fluid F, closed by a threaded closing element 12a, also called the shank, which in turn is associated with a flywheel 12b, rotated manually as indicated by double arrow f, which has the function of closing or opening the flow of pressurised fluid F from cylinder 12 to dispensing device 20.

Pressurised fluid F contained in cylinder 12 is preferably constituted by carbon dioxide (CO2), present in cylinder 12 in a liquid phase, indicated as CO2', which in turn is in equilibrium with its vapour pressure with a gaseous phase CO2", wherein said two phases, liquid and gaseous, are separated by a surface S.

A suction system, for example consisting of a suction pipe 13 ("deep tube") that takes up CO2' in the liquid phase, can be installed to feed pressurised fluid F, namely carbon dioxide CO2, to dispensing device 20.

When the carbon dioxide CO2 stored in cylinder 12, which is pressurised to the extent that it is converted to a liquid state or phase, is fed to dispenser 20, it expands in the external environment, at ambient pressure, thus cooling and generating at the output from dispensing device 20 a flow G consisting of dry ice, indicated as NC, this being the name usually given to the state acquired by carbon dioxide when it is expanded and cooled in the external environment from a pressurised state.

In particular said flow G of dry ice NC, having a temperature of approx. −78° C., presents a gaseous fraction, amounting to approx. two-thirds of the total mass, and a remaining fraction, consequently amounting to approx. one-third of said mass, which consists of solidified CO2 microparticles or pellets p (FIGS. 2A and 5A), formed as a result of the expansion in the external environment, and consequent cooling, of carbon dioxide CO2 fed from reserve 11.

Other fluids able to undergo the same transformations from a pressurised state, namely to expand and cool in such a way as to generate a cold flow at the outlet of dispensing device 20, can obviously be used as an alternative to carbon dioxide CO2, while still remaining in the ambit of the present innovation.

Figure 2A:
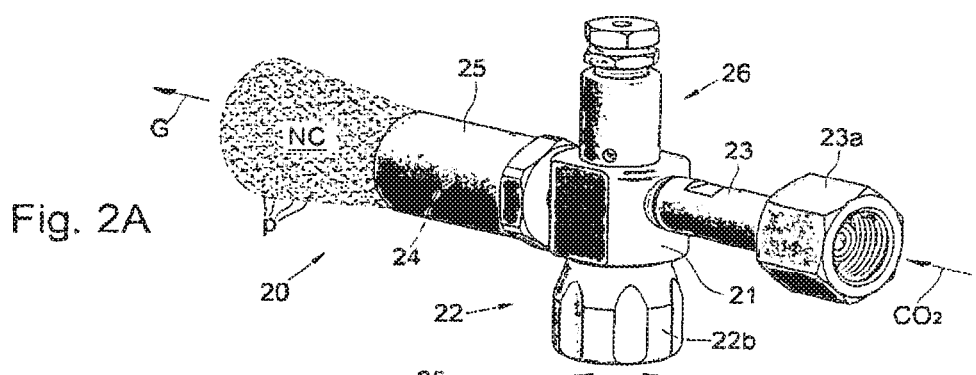
FIGS. 2A and 2B are two different perspective views, the second partly in cross-section, of a dry-ice dispensing device which is an essential part of the equipment according to the invention shown in FIG. 1.
Figure 2B:
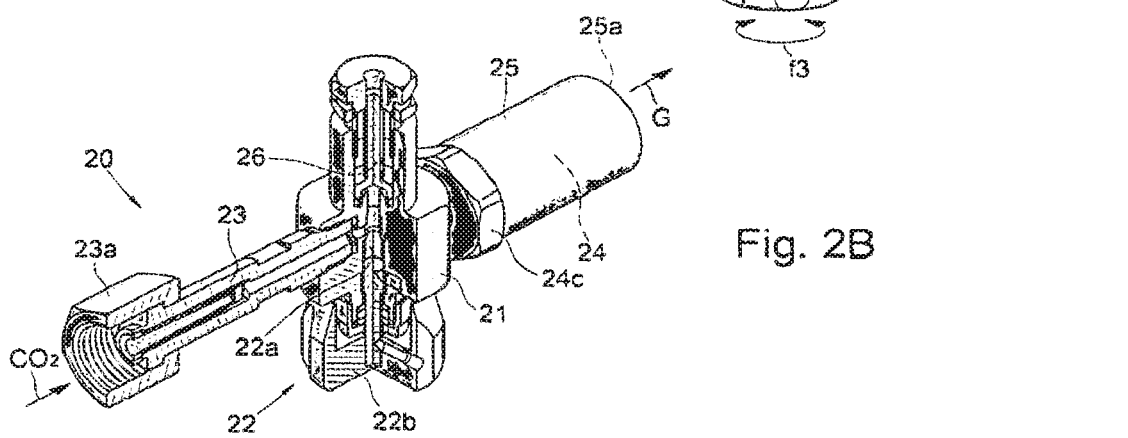
Figure 5:
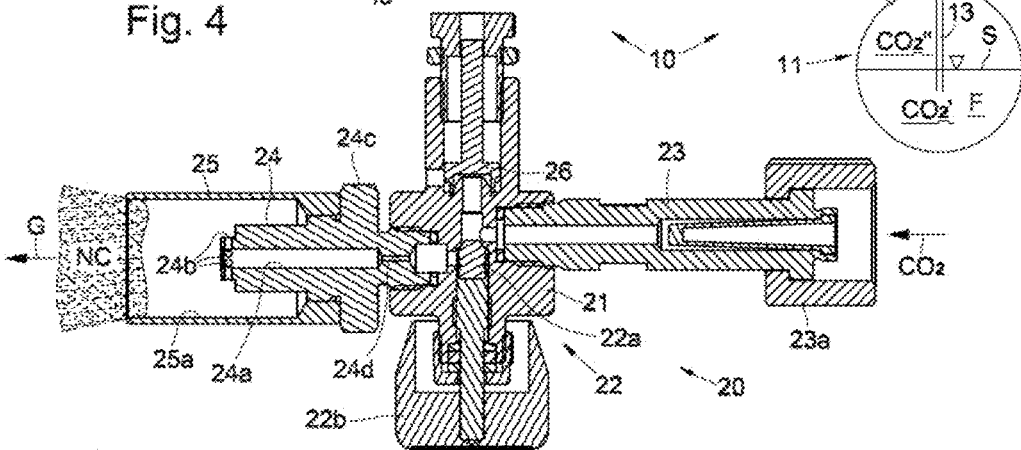
FIG. 5 is a view in cross-section along line V-V shown in FIG. 4.

As shown in FIGS. 2A-2B to 5, dispensing device 20 of cleaning equipment 10 in turn comprises:
 a first central body 21, associated with a regulation valve 22;
 a second hollow body 23, in rod form, which is tightly connected at one end to shank 12a of cylinder 12 to receive pressurised CO2 from the latter, as indicated by arrow X, and at the other end to the central body 21 of dispensing device 20;
 a dispensing nozzle 24, fitted at the outlet of dispensing device 20, to generate and dispense flow G of dry ice NC; and
 an adapter sleeve 25, associated with dispensing nozzle 24 and having the function of adapting and coupling dispensing device 12 to welding torch TS to be cleaned.

Regulation valve 22, associated with central body 21, has the function of regulating the flow rate of the CO2 originating from cylinder 12 which feeds dispensing device 20, and consequently also of regulating the intensity of dry-ice flow G directed against welding torch TS to be cleaned.

Said regulation valve 22 is a manual needle valve, and comprises in particular a needle or cut-off element 22a designed to be manually regulated in position, through a knob 22b, swiveling manually so as to variably cut off the flow of CO2 originating from cylinder 12.

Second body 23 is coupled to cylinder 12, namely the corresponding shank 12a, by a threaded coupling indicated as 23a, which complies with the UNI 4406 standard for pressure reducers.

Dispensing nozzle 24 presents a central pipe 24a along its axis, and at one outward-facing tip a series of holes and grooves, shown as 24b, wherein central pipe 24a and said holes and grooves 24b are configured to suitably direct the flow of carbon dioxide, and consequently also dry-ice flow G which forms by expansion in the external environment and consequent cooling of said carbon dioxide, to the outlet of dispensing device 20, in particular to the interior of welding torch TS.

In particular, holes 24b extend, in said tip area of nozzle 24, radially to the axis of central pipe 24a so as to convey and laterally direct at least part of dry-ice flow G.

Moreover, a calibrated pipe 24d places central pipe 24a of dispensing nozzle 24 in communication with the area, in dispensing device 20, of cut-off element 22a of regulation valve 22.

Dispensing nozzle 24 is also connected at the other end, opposite to the tip, to central body 21 of dispensing device 20 via a coupling 24c of type EN 66, as required by the standards governing the couplings of welding gas feed pipes.

Adapter sleeve 25 consists of a tubular body designed to receive outer body or shroud C of welding torch TS to be cleaned in the corresponding tubular cavity 25a, and couple with it.

Figure 3:
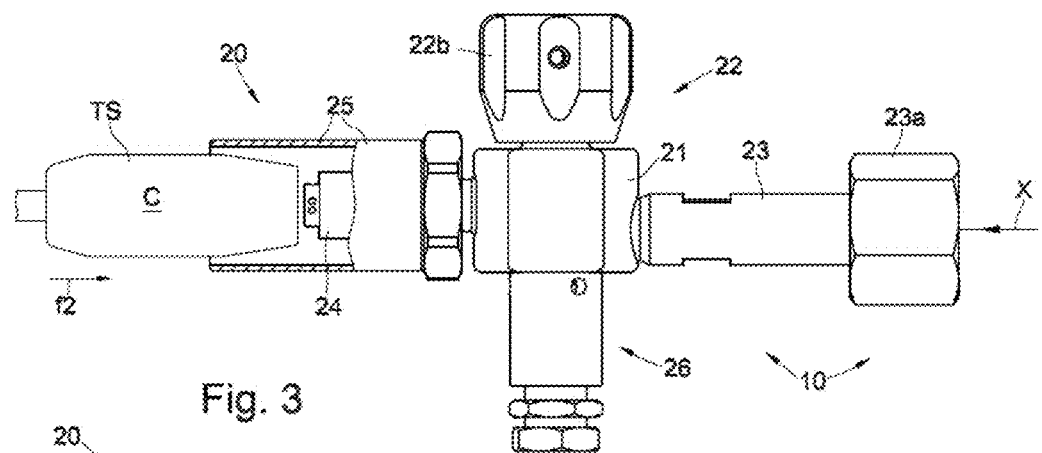
FIGS. 3 and 4 are two normal views, on two different planes, of the dispensing device shown in FIGS. 2A and 2B.
Figure 4:
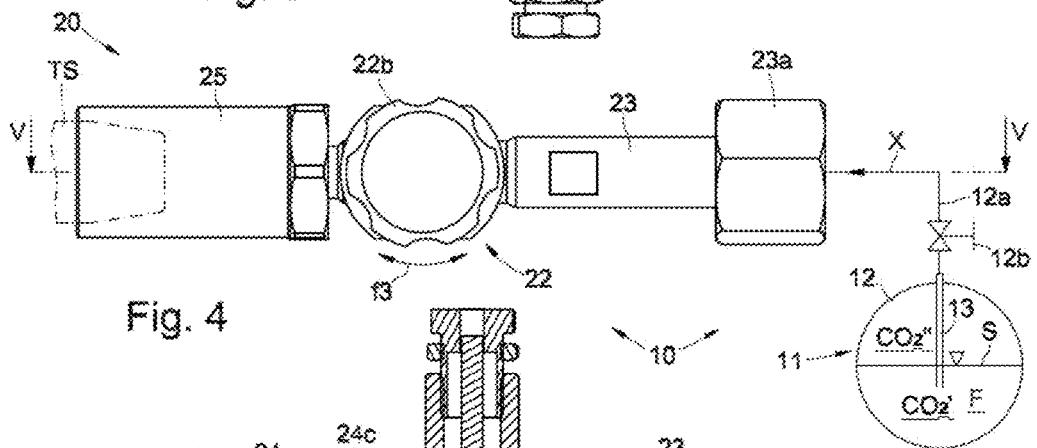

With this configuration, dispensing device 20 is therefore designed to couple to cylindrical body C of welding torch TS by means of a male-female coupling (FIGS. 3 and 5A), wherein adapter sleeve 25 acts as the female part and the tip of dispensing nozzle 24 acts as the male part.

Adapter sleeve 25 and dispensing nozzle 24 are interchangeable, and are selected to form part of dispensing device 20 in order to adapt it to the range and types of welding torches currently in use in the various welding systems, and to the usual dimensions of external cylindrical body (C) of welding torches (TS), whose diameter (d) is usually between 5 and 20 mm.

Dispensing device 20 comprises a relief or overpressure valve 26, associated with the central body and normally calibrated for safety reasons to a pressure of over 100 bar, typically 120 bar, which is designed to operate if dangerous overpressures are created in dispensing device 20.

Said relief valve 26 is appropriately fitted along the direction of flow of carbon dioxide $CO_2$ through dispensing device 20, upstream of needle regulation valve 22, so that it can operate promptly when said dangerous overpressures occur in the area of dispensing device 20, where there is the highest risk thereof, namely towards cylinder 12 containing the pressurised carbon dioxide.

When using cleaning equipment 10, a welding torch TS to be cleaned, which is often still very hot, for example at a temperature of 600° C., as it has just been used for welding, is inserted into adapter sleeve 25, as indicated by arrow f2 in FIG. 1, so as to couple to dispensing device 20.

The operator, if s/he has not already done so, then activates flywheel 12b associated with cylinder 12, as indicated by arrow f1, to allow the pressurised carbon dioxide $CO_2$ contained in cylinder 12 to feed dispensing device 20.

At the same time, the same operator operates knob 22b of regulation valve 22, as indicated by arrow f3, to release the flow of carbon dioxide $CO_2$, by means of cut-off needle 22a, through dispensing device 20.

In this way the carbon dioxide $CO_2$ is free to flow through dispensing device 20 and to expand, in the area downstream of cut-off needle 22a, namely along pipe 24a of dispensing nozzle 24 and in the external environment, to form jet G of dry ice NC, containing solidified particles of $CO_2$ produced by its rapid cooling following said expansion, which is directed against welding torch TS to clean it.

The operator can also regulate jet G to the desired intensity and strength, again by operating knob 22b.

The impact of said low-temperature flow G of dry ice NC with welding torch TS which, as stated, is still very hot, produces a kind of heat shock which, combined with the mechanical action produced by the solidified particles of $CO_2$ present in dry ice NC, leads to complete cleaning of welding torch TS, namely total removal of the welding slag and residues accumulated on it during the last welding use.

Figure 5A:
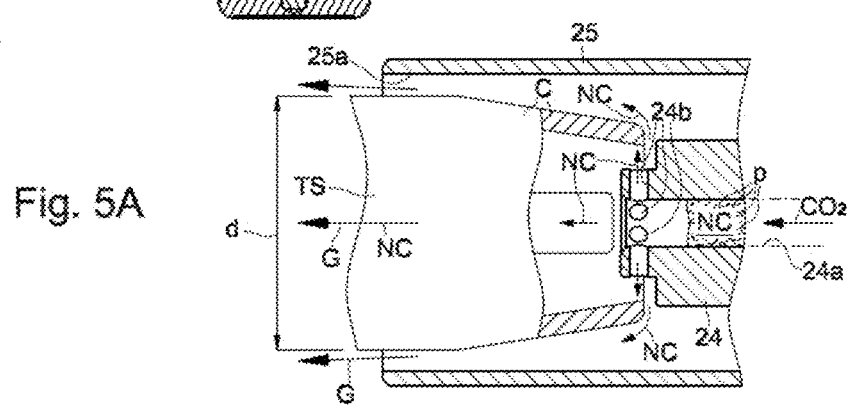
FIG. 5A is a view on an enlarged scale of the coupling area between the dispensing device shown in FIGS. 2A and 2B and a welding torch to be cleaned.

Said action of removing welding slag and residues is made even more effective by the special male-female coupling formed, at this stage of cleaning, between dispensing device 20 and welding torch TS to be cleaned, as shown in FIG. 5A, wherein adapter sleeve 25, acting as the female part, receives and cooperates with the outer surface of body or shroud C of welding torch TS, and the tip of dispensing nozzle 24, acting as the male part, penetrates into and cooperates with the inner area of shroud C.

Moreover, the fact that at least part of the flow of carbon dioxide and consequently of dry ice NC is conveyed and directed, through holes 24b, laterally in the tip area of dispensing nozzle 24, as indicated by the arrows in FIG. 5A, means that dry ice NC reaches and collides effectively against the various areas of welding torch TS, even the innermost ones, to remove all the accumulated slag from them.

After the impact with welding torch TS, the solidified particles of dry ice sublimate; in other words they pass directly from the solid to the gaseous state, without leaving any trace on the surface of welding torch TS.

Welding torch TS is thus cleaned quickly, effectively and completely, and this cleaning operation leaves no trace or residues, so the welding torch is restored to the optimum conditions for further welding use.

It is clear from the above description that the present invention fully achieves its purposes, and in particular provides a new type of equipment which is easy and practical to use, ensures efficient, complete cleaning of a welding torch, and increases its working life, compared with the welding torch cleaning devices and systems currently in use and available on the market.

Figure 8A:
FIGS. 8A and 8B respectively show a generic welding torch after being used for welding, and the same welding torch after undergoing cleaning treatment with the equipment according to the invention.
Figure 8B:

By way of confirmation of the novel characteristics and performance of the present invention, FIGS. 8A and 8B respectively show a generic welding torch after being used for welding, and therefore with various areas presenting large deposits of welding slag and residues, indicated as SS, and the same welding torch after cleaning with equipment 10 to which this invention relates.

As will be seen from FIG. 8B, welding torch TS, after being cleaned with equipment 10, is substantially free of slag and residues SS, which have consequently been completely removed, even in the parts of welding torch TS which are most difficult to reach, such as those in shroud C.

VARIATIONS

Without prejudice to the basic concepts of the present invention, it is also clear that modifications and further improvements can be made to the welding torch cleaning equipment described so far, while still remaining in the ambit of the present innovation.

Figure 6:
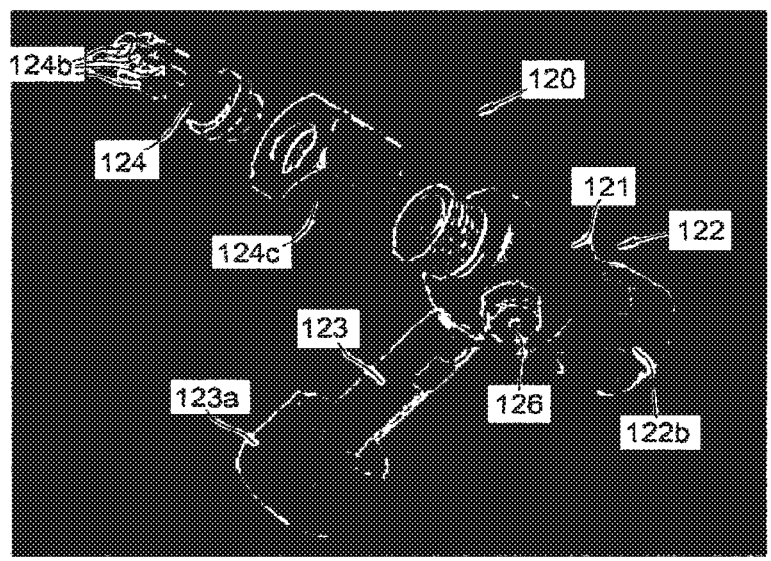
FIG. 6 is a partial perspective view, in exploded form, of a simplified variation on the dispensing device shown in FIGS. 2A and 2B.
Figure 7:
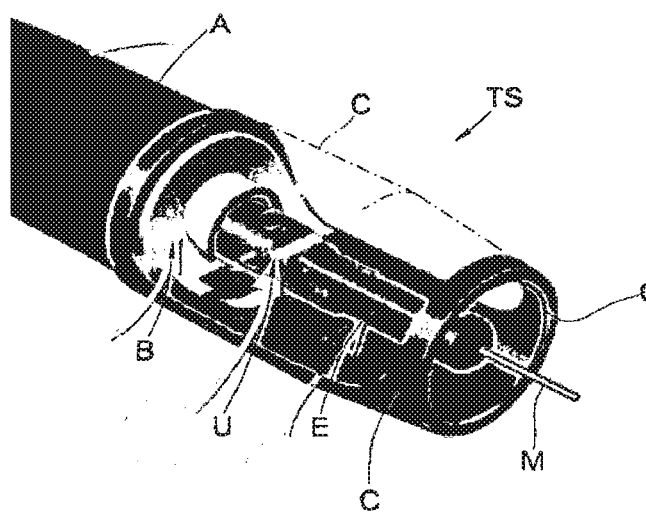
FIG. 7 is a cross-section of a typical welding torch designed to be cleaned with the cleaning equipment according to the invention.

For example, according to a simplified variation indicated as 120 and shown in FIG. 6, wherein the parts corresponding to those of embodiment 20, described above, are specified with numerical references incremented by 100, the dry-ice dispensing device has no coaxial adapter sleeve and is fitted around dispensing nozzle 124, so that in this simplified version, dispensing device 120 is designed to couple, with a male coupling method only, to the tip of dispensing nozzle 124 of welding torch TS to be cleaned.

Moreover, the various components of dispensing device 20, namely central body 21 integrated with the corresponding regulation valve 22, body or rod 23 coupled to the shank of cylinder 12, and dispensing nozzle 24, can be composed and assembled together in various ways, according to different reciprocal orientations, depending on the assembly requirements and the available space.

For example, in FIG. 1, dispensing device 20 is assembled in a configuration wherein needle regulation valve 22 is in axis with dispensing nozzle 24, and consequently also with adapter sleeve 25.

Conversely, in the embodiment shown in FIGS. 2A-2B to 5, dispensing device 20 presents a configuration wherein needle regulation valve 22 is normally oriented to the axis of dispensing nozzle 24 and adapter sleeve 25, which in turn are in axis with body 23 coupling dispensing device 20 to shank 12a of cylinder 12.

Equally, in simplified version 120 of the dispensing device, as shown in FIG. 6, needle regulation valve 122 and dispensing nozzle 124 extend along the same axis, while body 123 coupling to the pressurised carbon dioxide reserve and storage system extends normally to said axis.

Moreover, dispensing nozzle 24 and adapter sleeve 25 are interchangeable, and are selected to adapt dispensing device 20 to the dimensions, shapes and types of welding torches TS currently in use in the various manual or automatic welding systems, such as those mentioned and briefly illustrated above, and in particular to adapt adapter sleeve 25 to the dimensions of external body C of the welding torches to be cleaned, the diameter of which, as already stated, usually ranges between 5 and 20 mm.

Moreover, according to a further variation of the cleaning equipment according to the invention, dry-ice dispensing device 20, instead of being directly connected to cylinder 12, can be connected indirectly to it, for example via a pipe, in order to receive pressurised carbon dioxide CO2.

Finally, relief valve 26 can be mounted in different areas of dispensing device 20, depending on the application.

The invention claimed is:

1. Equipment for cleaning welding torches comprising:
a reserve of a pressurized fluid comprising CO2; and
a dispensing device connected to said reserve to receive said pressurized fluid and dispense onto a welding torch a flow of solidified CO2 microparticles produced by expansion in the external environment and consequent cooling of said fluid received from said reserve,
wherein said dispensing device comprises:
a regulating valve to regulate the rate and intensity of said flow of solidified CO2 microparticles supplied to said welding torch,
a dispensing nozzle fixed at the exit of said dispensing device to generate and dispense said flow of solidified CO2 microparticles onto said welding torch, and
an adapter sleeve associated with said dispensing nozzle and designed to receive the external body of said welding torch;
wherein said dispensing device is designed to couple with said welding torch to be cleaned via a male-female coupling, with the adapter sleeve acting as the female part with respect to the outside of an external body of the welding torch and with the tip of said dispensing nozzle acting as the male part with respect to the inside of the external body of the welding torch in said coupling, and
wherein said dispensing nozzle of said dispensing device has along its axis a central pipe and, at one outwards-facing tip end, a series of holes and grooves, with said central pipe, said tip end and said holes and grooves being configured to suitably direct, at the output of the dispensing device and towards the interior of the welding torch, the flow of $CO_2$ microparticles, and with said holes extending, in said tip end of the dispensing nozzle, in the perpendicular and radial directions relative to the axis of the central pipe so as to convey and perpendicularly direct at least a part of the flow of $CO_2$ microparticles.

2. The equipment of claim 1 wherein said reserve comprises a cylinder containing said carbon dioxide in a liquid phase and a gaseous phase and is fed to said dispensing device by a siphon tube immerse in said liquid phase, and wherein said cylinder is associated with at least one closing element having the function of closing or opening the supply of the pressurized carbon dioxide from said cylinder to said dispensing device.

3. The equipment of claim 1 wherein said regulating valve contains a manual needle valve.

4. The equipment of claim 3 wherein said regulating valve includes a cut-off needle designed to be manually regulated so as to cut off the flow of carbon dioxide originating from said ordinary cylinder.

5. The equipment of claim 1 wherein said dispensing device comprises:
a first central body with which said regulating valve is associated, and
a second elongated hollow body connected at one end to said reserve to receive said fluid at the other end to the central body of said dispensing device,
wherein said first and second body and said dispensing nozzle are designed to be assembled with each other according to different reciprocal orientations to compose said dispensing device.

6. The dispensing device of claim 5 wherein said dispensing device is designed to adapt, by suitably replacing the corresponding dispensing nozzle and adapter sleeve, to the range and types of welding torches having dimensions between 5 and 20 mm.

7. The cleaning equipment of claim 1 adapted for use for cleaning said welding torches that are part of a manual or automatic welding system, wherein said dispensing device is connected directly or indirectly via a pipe with said reserve to receive the pressurized fluid.

8. A dispensing device designed to receive a pressurized fluid comprising carbon dioxide, from a corresponding reserve and to dispense said fluid onto a welding torch in order to clean it, said fluid being dispensed in a jet which has a temperature below ambient temperature and said jet being produced by expansion in the external environment and consequent cooling of said fluid so as to produce a flow of solidified $CO_2$ microparticles and said reserve being constituted by an ordinary cylinder containing said fluid and flowing through at least one closing element having the function of closing or opening the supply of said fluid from said cylinder to said dispensing device,
wherein said dispensing device comprises:
a regulating valve designed to regulate the rate and intensity of said jet dispensed onto said welding torch;
a dispensing nozzle fitted at the exit of the dispensing device and fixed thereto to generate and dispense said jet onto said welding torch;
an adapter sleeve associated with said dispensing nozzle to couple said dispensing device to said welding torch;
a first central body associated with said regulating valve; and
a second hollow body connected at one end with said cylinder to receive said pressurized fluid and connected at the other end to the central body of said dispensing device;
wherein said dispensing device is designed to couple to said welding torch by means of a male-female coupling with the adapter sleeve acting as the female part with respect to the outside of an external body of the welding torch and with the tip of said dispensing nozzle acting as the male part with respect to the inside of the external body of the welding in said coupling, and wherein said dispensing nozzle of said dispensing device has along its axis a central pipe and, at one outwards-facing tip end, a series of holes and grooves, with said central pipe, said tip end and said holes and grooves being configured to suitably direct, at the output of the dispensing device and towards the interior of the welding torch, the flow of $CO_2$ microparticles, and with said holes extending, in said tip end of the dispensing nozzle, in the perpendicular and radial directions relative to the axis of the central pipe so as to convey and perpendicularly direct at least a part of the flow of $CO_2$ microparticles.

9. The dispensing device of claim 8 wherein said first and said second body and said dispensing nozzle are designed to be variously assembled with each other according to different reciprocal orientations to compose the dispensing device.

10. The dispensing device of claim 9 wherein said dispensing device is designed to adapt, by suitably replacing the corresponding dispensing nozzle and adapter sleeve, to the range and types of welding torches having dimensions between 5 and 20 mm.

\* \* \* \* \*